(No Model.)

W. A. LAMB & M. D. CROWELL.
LOCK VALVE.

No. 440,714. Patented Nov. 18, 1890.

Witnesses:
W. M. Bjorkman
Henry L. Reckard

Inventors:
William A. Lamb,
Myron D. Crowell,

By their Attorneys,
Francis H. Richards

UNITED STATES PATENT OFFICE.

WILLIAM A. LAMB AND MYRON D. CROWELL, OF HARTFORD, CONNECTICUT.

LOCK-VALVE.

SPECIFICATION forming part of Letters Patent No. 440,714, dated November 18, 1890.

Application filed March 4, 1890. Serial No. 342,654. (No model.)

*To all whom it may concern:*

Be it known that we, WILLIAM A. LAMB and MYRON D. CROWELL, citizens of the United States, residing at Hartford, in the county of Hartford and State of Connecticut, have invented certain new and useful Improvements in Lock-Valves, of which the following is a specification.

This invention relates to lock-valves for steam, water, or other pipes, and more especially to the stem-actuating wheel or handle of such valves, the object being to provide for leaving the valve-stem or other like part of any mechanism securely set in any position by unlocking such actuating part from such stem or shaft.

To this end the invention consists in the improvements hereinafter more fully set forth.

Figure 1:
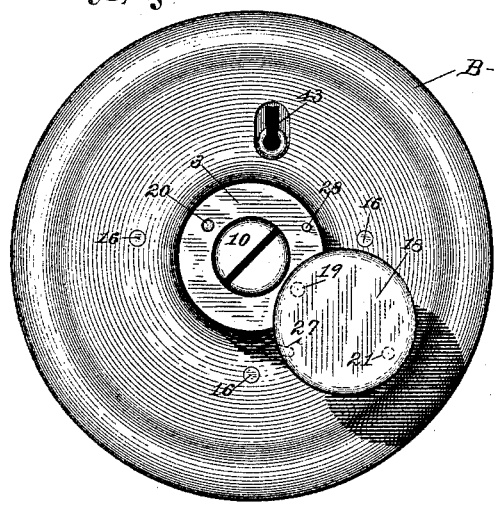
Figure 2:
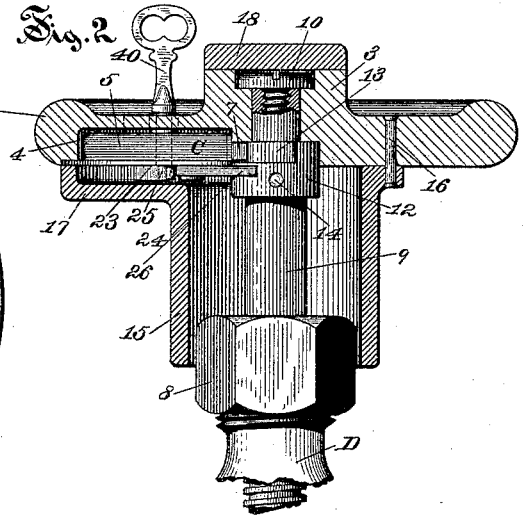
Figure 5:
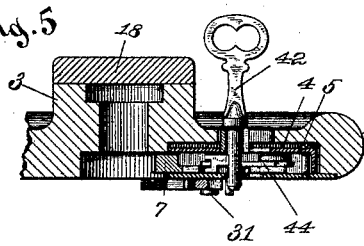
Figure 6:
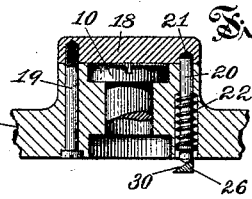
Figure 3:
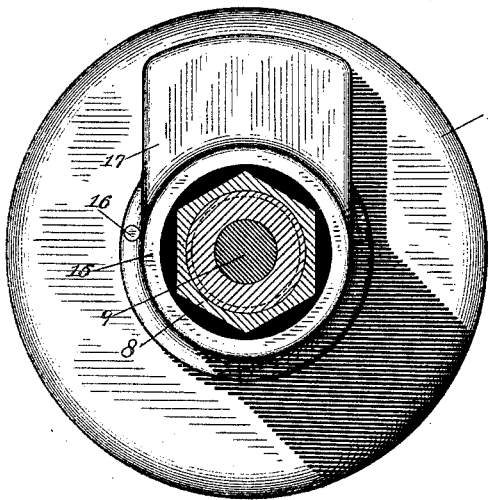
Figure 4:
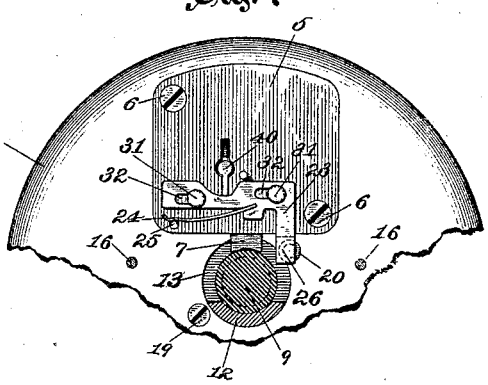

In the drawings accompanying and forming a part of this specification, Figure 1 is a top or plan view of portions of a valve embodying our present improvements. Fig. 2 is a central vertical section of the same. Fig. 3 is a plan view of the under side of the stem-actuating wheel. Fig. 4 is a view similar to a portion of Fig. 3, the guard-rim being removed. Fig. 5 is a sectional view of a portion of the hand-wheel and the locking devices. Fig. 6 is a sectional view of a portion of the hand-wheel, illustrating the method of locking the hand-wheel cover.

Similar characters designate like parts in all the figures.

The hand-wheel B, as herein shown, is of an ordinary form used on valves. Said wheel has a hub 3 and a recess 4, formed in the under side thereof to receive the lock, which is designated in a general way by C. Said lock is attached to a frame or lock-case 5, that fits into the said recess 4, and is screwed in place by the screws 6. The bolt of said lock is designated by 7.

In Fig. 2, a portion D of a valve is shown having the usual stuffing-box 8 and the valve-stem 9. The upper end of the said stem 9 is fitted into the hand-wheel and secured therein by the screw 10, whose head lies in a recess in the hub 3. A collar or clutch-ring 12, having a notch 13 formed therein to receive the end of bolt 7 of the lock, is fixed by a pin 14 or otherwise to the stem 9, near the upper end thereof. The guard-rim 15 is provided to prevent access to the stem 9, and thus secure it from being tampered with by means of a pipe-wrench, or otherwise than by the hand-wheel. Said guard is shown secured to the under side of the wheel by the rivets 16, and has a box-shaped projection 17, covering the lock-frame 5, and the device for locking and unlocking the cover 18 of the hub 3. The cover or plate 18 is pivotally secured to the hub 3 of the wheel B by a pivot-screw 19, as is best shown in Fig. 6. Said cover is locked in place by the pin or bolt 20, entering the hole 21, that is formed in the under side of said cover to receive the same. Said bolt 20 is provided with a spring 22, to normally hold said bolt out of engagement with the cover 18. The key-actuated bolt 23, carried on the under side of the lock-frame, is furnished with an ordinary detent-spring 24, bearing against a pin 25 for holding said bolt in place in a well-known manner. The working end 26 of said bolt 23 has a beveled face 30, substantially as shown in Fig. 6, which bears on the lower end of the bolt 20, and thus actuates the same. A guide-notch 27, formed in the cover 18, and a stop or guide pin 28 in the hub 3 serve to limit the movement of said cover and stop the same in position for locking. The bolt 23 is, or may be, held in place and guided by the studs 31, passing through slots 32 in said bolt, and fixed in the lock-plate in a well-known manner. (Indicated in Figs. 4 and 5.) Said bolt 23 is actuated by the key 40, which passes down through the lock and works underneath the same, as indicated in Figs. 2 and 4. Another key 42 fits into the same key-hole 43, Fig. 1, and is shaped for working the main bolt 7. For this purpose the lock-case contains any usual tumblers, as 44, whereby each lock of a series may be fitted to be worked by a separate key. This feature, and the use of a distinct form of key for unlocking the cover 18, enables us to use a large number of lock-valves, as in a large public or office building, so that each tenant or room may have valves operated by their own key, while the janitor or superintendent may have a key, as 40, giving him access to all the valves throughout the building. Ordinarily while the valve is in use (the cover 18 being locked) the bolt 7 stands withdrawn from the notch 13, so that the wheel B is free to revolve on the stem or shaft 9. When said stem is to be turned, the operator inserts the proper key 42 and projects said bolt 7 into said notch 13, thus engaging said wheel and stem, and permitting the latter to be turned by the former.

It will be observed that the notch 13 is at the upper end of the clutch-ring 12, so that on removing the screw 10 the wheel B may be removed, whether or not the wheel be locked or unlocked from the stem 9. This feature, the wheel being removably mounted, as set forth, to turn freely on the stem, gives the holder of the master-key 40 access to and control of the valves, regardless of the locking of the wheels by the separate keys 42.

The "notch" 13, so called, is preferably extended through a large portion of the circle, as indicated in Fig. 4, so that the bolt will more easily be operated.

It should be understood that our invention does not reside in the lock itself, but that any suitable or convenient form or kind of lock mechanism may be used for operating and retaining in place the lock-bolts or either of them; also, that the lock represented by bolt 23 may, and usually will be, a "tumbler-lock" similar to that shown for the bolt 7; but other forms of locks than the well-known tumbler-locks are adapted for our present purposes—as, for instance, the well-known "Yale" type of key-actuated locks.

Having thus described our invention, we claim—

1. In a lock mechanism for valves, the combination, with the stem and with a wheel or handle removably mounted to revolve freely thereon, of a clutch-ring or notch on the stem and a lock-bolt on the wheel or handle adapted to be engaged with said ring or notch, all combined and operated substantially as described.

2. In a lock mechanism for valves, the combination, with the stem and the wheel mounted to turn freely thereon, of the clutch-ring having notch 13 and the key-actuated bolt 7 interposable into said notch, all combined and operated substantially as described.

3. In a lock mechanism for valves, the combination, with the stem, and the wheel removably mounted to turn freely thereon, of the clutch-ring 12, fixed to said stem and having the notch 13 at the upper end of the ring, said wheel being furnished with a key-actuated lock-bolt interposable into said notch, all substantially as described, and for the purpose specified.

4. In a lock mechanism for valves, the combination, with the stem having the clutch-ring, of the wheel, a lock-bolt carried by the wheel for engaging said clutch-ring, a shiftable cover preventing access for removing the wheel, and a lock securing said cover, all combined and operating substantially as described.

5. In a lock mechanism for valves, the combination, with the stem and the wheel secured thereon by a removable screw, of the cover shiftable on said wheel for gaining access to said screw and a key-actuated cover-lock for locking said cover, said cover-lock comprising two bolts of which the first engages the cover and the second is key-actuated and constructed to operate the first bolt, all substantially as described.

6. In a lock mechanism for valves, the combination, with the stem and with the wheel removably mounted to revolve freely thereon, of one key-actuated bolt engaging said stem and another key-actuated bolt securing access for removal of the wheel, both said bolts being reached through one key-hole, all substantially as described.

7. In a lock mechanism for valves, the combination, with the valve and the projecting stem thereof, of the wheel, lock mechanism on the wheel, and the guard-rim protecting said mechanism and stem, all substantially as described.

WILLIAM A. LAMB.
MYRON D. CROWELL.

Witnesses:
HENRY L. RECKARD,
F. H. RICHARDS.